United States Patent [19]

Moran et al.

[11] Patent Number: 4,939,659

[45] Date of Patent: Jul. 3, 1990

[54] SPEED/RPM TRANSMITTING DEVICE

[75] Inventors: Stephen P. Moran, Elyria; James M. Lawson, Wellington; Ronald W. Friend, Amherst; Duncan E. Estep, Elyria, all of Ohio

[73] Assignee: Allied-Signal, Inc., Morristown, N.J.

[21] Appl. No.: 144,365

[22] Filed: Jan. 15, 1988

[51] Int. Cl.⁵ ............................................. G01P 3/489
[52] U.S. Cl. ............................ 364/431.04; 364/569; 364/571.01; 123/480; 123/417
[58] Field of Search ................... 364/431.07, 571.01, 364/143, 424.04, 431.05, 431.04, 569, 571.02, 571.04; 340/52 F, 870.04; 123/417, 480; 377/52, 20

[56] References Cited

U.S. PATENT DOCUMENTS

| | | | |
|---|---|---|---|
| 4,121,055 | 10/1978 | Doherty | 340/870.04 |
| 4,255,789 | 3/1981 | Hartford et al. | 123/417 |
| 4,271,402 | 6/1981 | Kastura et al. | 364/424.04 |
| 4,296,334 | 10/1981 | Wong | 364/143 |
| 4,472,777 | 9/1984 | Youngblood | 340/52 F |
| 4,538,235 | 8/1985 | Henning | 377/20 |
| 4,546,487 | 10/1985 | Dackow | 377/20 |
| 4,564,918 | 1/1986 | McNally et al. | 377/20 |
| 4,581,703 | 4/1986 | Bassi et al. | 364/431.05 |
| 4,584,528 | 4/1986 | Ohmae et al. | 377/20 |
| 4,613,950 | 9/1986 | Knierim et al. | 377/20 |
| 4,712,072 | 12/1987 | Kawanabe | 377/20 |
| 4,740,915 | 4/1988 | Bonitz et al. | 364/431.07 |

FOREIGN PATENT DOCUMENTS

| | | |
|---|---|---|
| 0059433 | 9/1982 | European Pat. Off. . |
| 0090717 | 10/1983 | European Pat. Off. . |
| 0094090 | 11/1983 | European Pat. Off. . |

OTHER PUBLICATIONS

1981 IECI Proceedings, "Applications of Mini and Microcomputers", Nov. 1981.

Primary Examiner—Parshotam S. Lall
Assistant Examiner—V. Trans
Attorney, Agent, or Firm—Ken C. Decker; W. N. Antonis

[57] ABSTRACT

A microcontroller having two internal timers is used to calibrate the engine rpm and wheel speed signals of a vehicle and to time the output periods of these signals, which are transmitted to, for example, digital rpm and speed indicators.

15 Claims, 9 Drawing Sheets

SPEED/RPM TRANSMITTING DEVICE

This invention relates to a device that converts the signals generated by a vehicle speed sensor and a vehicle engine rpm sensor into a standardized output signal for transmission to devices, such as an electronic speedometer and/or an engine rpm indicator, that display or otherwise use the signals.

Modern vehicles, particularly heavy duty trucks, are commonly equipped with one or more devices which display or otherwise utilize signals generated by electronic engine rpm sensors and by speed sensors which generate a pulsed output in proportion to wheel or engine rotational speed. Such devices include electronic speedometers, electronic rpm indicators, and other devices such as trip recorders. It is, of course, desirable that the signals be calibrated and transmitted by a single device, instead of being calibrated by each apparatus which uses the signals. Calibration in a single device avoids the prior art problem that the receiving devices disagree with one another (for example, a trip recorder may state that the vehicle traveled at 65 miles per hour, but the speedometer showed only 60 miles per hour). Furthermore, the accuracy of the system may be checked and adjusted at a single device. Of course, it is more economical to use a single device instead of multiple devices at each receiving apparatus.

The present invention not only accomplishes the above-mentioned objectives, but provides a way to calibrate both the speed and engine rpm signals in a single microcontroller having only two internal timers. In general, it is necessary for a microcontroller to have one timer which is used to calibrate each incoming signal and another timer to time the period of the corresponding signal on the corresponding output port of the microcontroller. Since each signal to be calibrated requires two timers, calibration of two signals requires four timers. The present invention effects calibration and transmission of both vehicle speed and engine rpm signals using a single microcontroller having only two timers.

These and other advantages of the present invention will become apparent from the following description, with reference to the accompanying drawings, in which:

FIGS. 5, 6, 6A, 6B, 7, 7A, 7B, 7C and 8-11 are detailed block system diagrams illustrating the manner in which the calculations effected as indicated in FIG. 4 are made.

Figure 1:
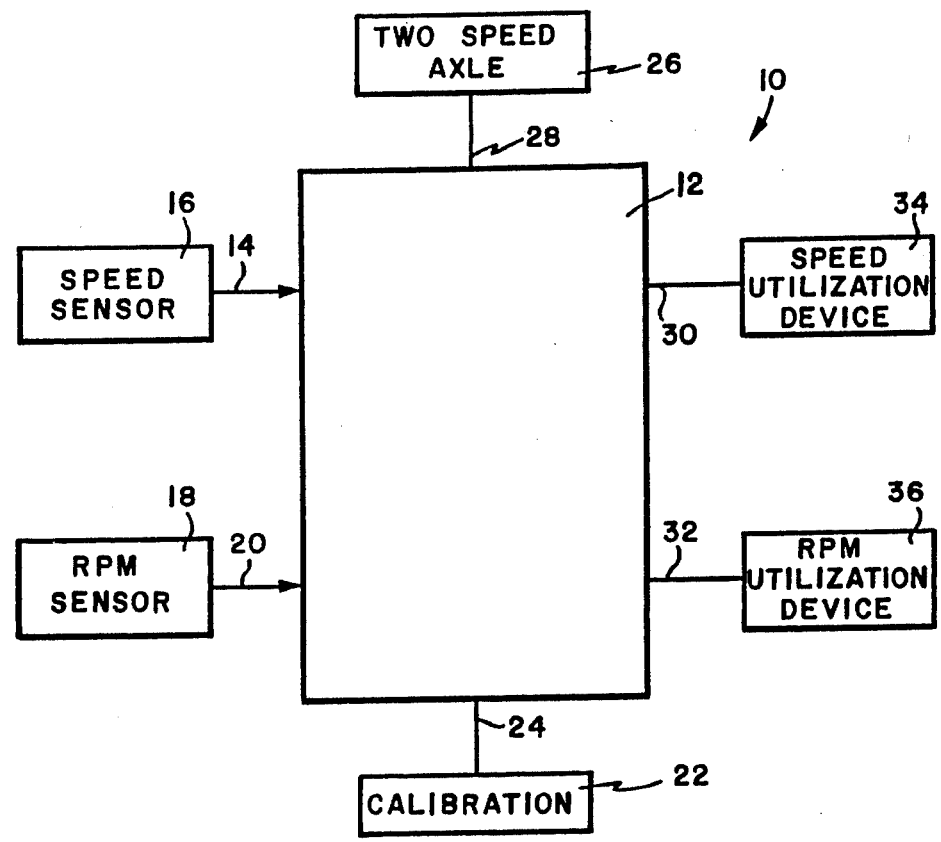
FIG. 1 is a diagrammatic illustration indicating the relationship between the microcontroller used in the present invention and the various inputs and outputs to and from the microcontroller.

Referring now to FIG. 1 of the drawings, the speed/rpm calibration sender unit is generally indicated by the numeral 10. Unit 10 includes a microprocessor 12 (which may, for example, be a 80c51 microprocessor available from Intel Corporation) that has a first input port 14 which is connected to a conventional speed sensor 16. Speed sensor 16 is of a type which is commonly used with vehicle adaptive braking systems and which includes a toothed tone wheel that is rotatable with, for example, a vehicle wheel or transmission shaft and an electromagnetic pickup mechanism disposed adjacent to the tone wheel. Accordingly, the pickup will produce a pulsed output, the frequency of pulses varying with the speed of rotation of the wheel. A similar sensor 18 generates a similar signal which is representative of the speed of rotation of the engine crankshaft. The signal from the rpm sensor 18 is transmitted to the in port 20 of microprocessor 12. A calibration switch 22, which will hereinafter be described, is connected to still another port 24 of the microprocessor 12, and a two speed axle switch 26 is connected to port 28 of microprocessor 12. Two speed axle switch 26 generates an input to the port 28 that is either high or low depending on the axle ratio selected by the vehicle operator.

A speed output port 30 and a rpm output port 32 are connected to, respectively, one or more speed utilization devices 34 and rpm utilization devices 36. The utilization devices 34, 36, may be, for example, an electronic digital speedometer or electronic digital rpm indicator, vehicle trip recorder, etc. The utilization devices 34, 36 "count up" starting from each change of state of their corresponding ports 30 or 32 until the next change of state. The length of time between the changes of states at the Ports 30, 32, is calculated to be proportional to the frequency of the pulses generated by the corresponding sensors 16 or 18. Accordingly, the function of the microprocessor 12 is to calibrate the pulsed inputs from the sensors 16, 18 into a speed output period signal at port 30 or an rpm output signal at port 32.

The microprocessor 12 includes two internal timers. One of the timers is used to calibrate the input signals from the sensor 16, 18. The other timer is used to time the speed output periods and rpm output periods transmitted to the utilization devices 34, 36. An important feature of this invention is that the same timer is used to calibrate both the speed sensor and rpm sensor inputs, and that the other timer is used to calculate the output periods for both the speed output by port 30 and the rpm output on port 32. Prior art devices required separate microprocessors for each of the input signals. The present invention, accordingly, provides substantial economies by using a single microprocessor to process both signals, even though this microprocessor includes only two internal timers.

Figure 2:
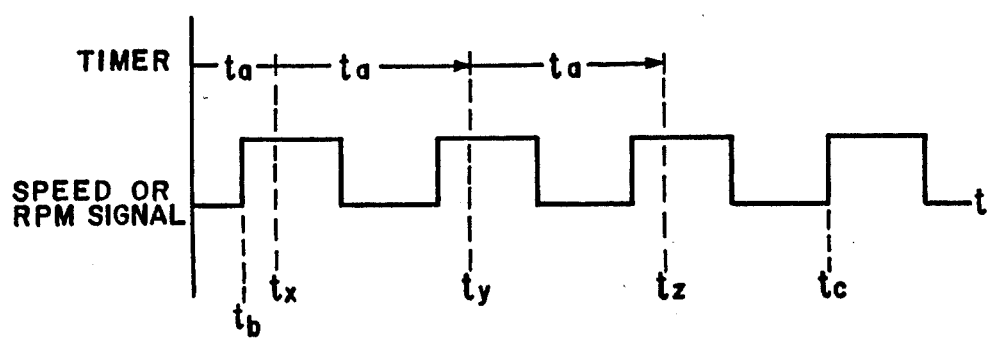
FIGS. 2 and 3 are time variant graphs indicating, respectively, the relationship with respect to time of the input signals to the microcontroller and the output signals from the microcontroller.

Referring now to FIG. 2, the incoming signal, which may be either the speed or rpm signal (since the same calibration routine is used for both using the same timer), is illustrated as a square wave input. The changes in state of the square wave representing the speed or rpm signal are hereinafter referred to as "external interrupts". The timer periods are indicated at the top of FIG. 2 as time $t_a$. Time $t_a$ in the present case, is set equal to 20 milliseconds, but any arbitrarily small timer period may be used. The timer times out at times indicated at $t_x$, $t_y$ and $t_z$ on FIG. 2. These times are hereinafter referred to as "timer interrupts".

The first timing period $t_a$ before the time $t_x$ is shown as a partial cycle, since it cannot be assured that the change in state of the speed or rpm signal will always occur at the same time that the timer times out. The time between the start of the measured period indicated at $t_b$ and the first timer interrupt at $t_x$, and the time between the last timer interrupt $t_z$ during the measurement period and the next external interrupt at $t_c$ are added together and are hereinafter referred to as the "net time". The measured output period of the signal illustrated in FIG. 2 can then be calculated by counting the number of timer periods ($t_a$), multiplying by the length of the timer period (a constant) and adding on the net time, and then dividing by the number of external interrupts.

In order to determine the speed output period at output ports 30 or 32, the measured period must be multiplied by a speed or rpm factor. The speed factor is a constant for any particular vehicle, and may be calculated from the rolling radius of the tire and the number teeth on the tone wheel, or may be measured by running the vehicle over a measured mile and counting the number of pulses produced by the corresponding speed sensor. The rpm factor may be calculated or measured in a similar manner. The speed output period is illustrated as the top curve on the graph of FIG. 3, and the rpm output period is indicated as the lower curve on FIG. 3.

Figure 3:
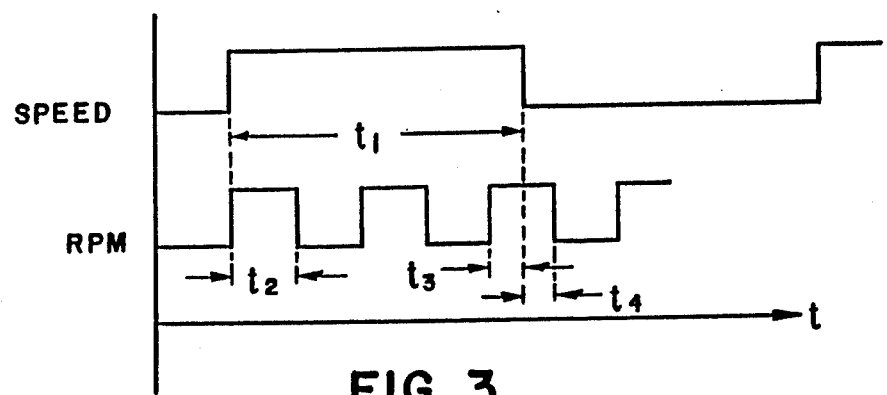

It is necessary to toggle the port 32 each time the rpm output period of FIG. 3 changes state, and it is necessary to toggle the speed output port 30 each time the speed output period indicated in FIG. 3 changes state. According to the invention, this is effected by using a single timer. Initially, the timer is loaded with the shorter period (in this case, the rpm period), and the port 32 is toggled at time out. The time $t_2$ is loaded in a timer queue, and the calculations described hereinafter are made several states ahead. The length of the timer period $t_2$ is then subtracted from $t_1$. The timer is reloaded each time it times out with the time $t_2$ representing the rpm output period in this case and the result subtracted from the time $t_1$ until the difference becomes negative. This difference is illustrated as time $t_3$ in FIG. 3. The timer is then loaded with the time $t_3$, and the speed output port 30 is then toggled when the timer times out. The timer is then reloaded with the time $t_4$, which is the difference between the time $t_2$ and the time $t_3$, and the port 32 is toggled when the timer times out. If either $t_3$ or $t_4$ are smaller than the timer load limit, both port 30 and 32 are toggled at the same time, but the difference is either added or subtracted from the period on the next cycle to prevent this inaccuracy from stacking up. The manner in which this is done will be described hereinafter.

Figure 4:
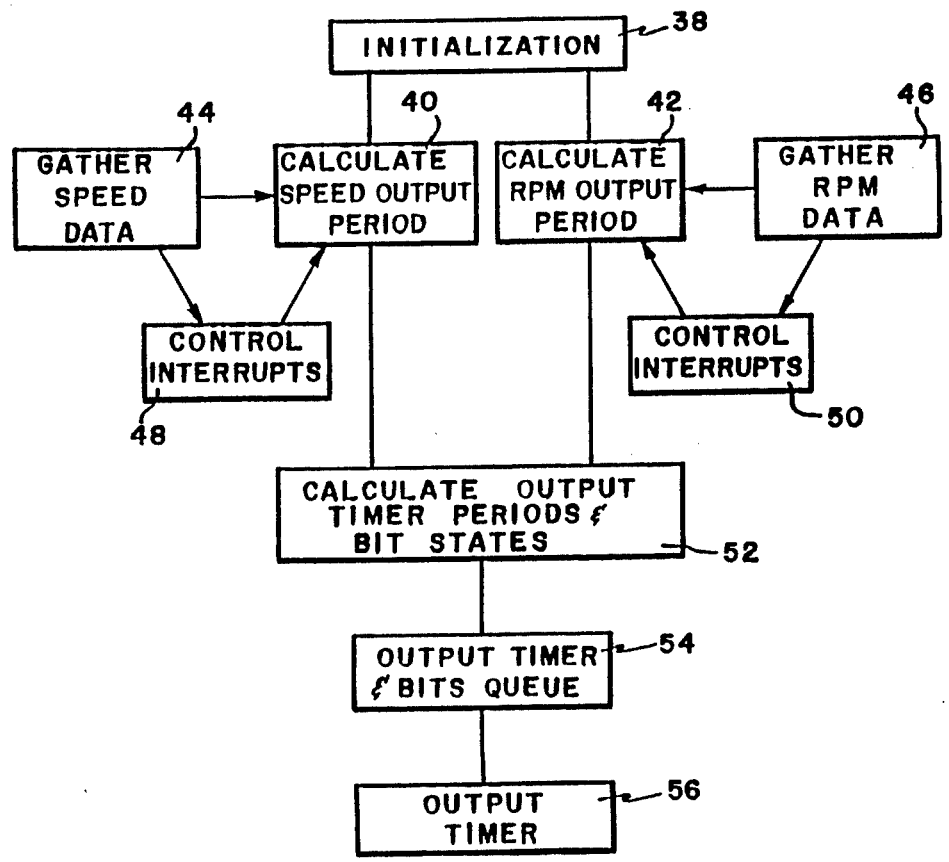
FIG. 4 is a diagrammatic illustration of the overall scheme in which the various inputs to the microcontroller are calibrated.
Figure 5:
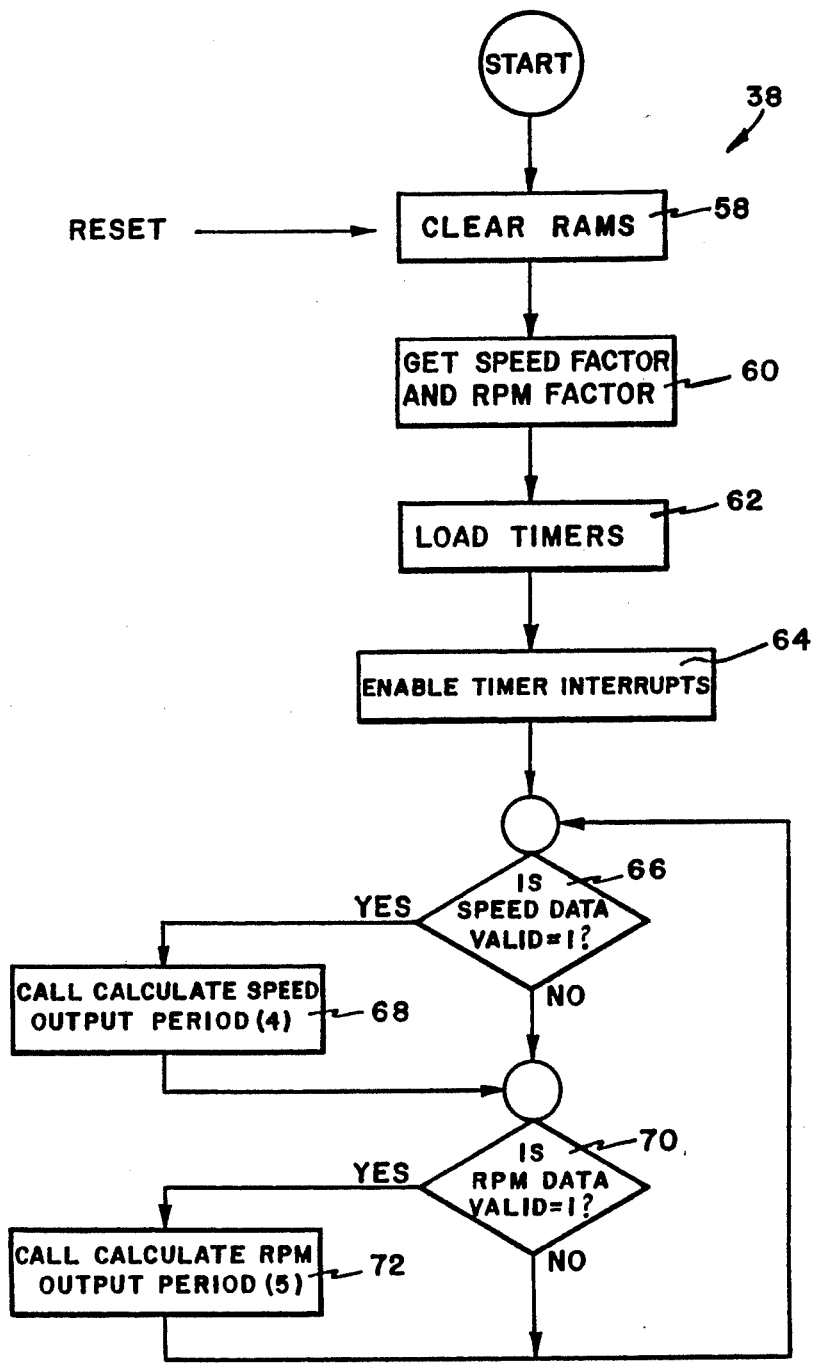
Figure 6:
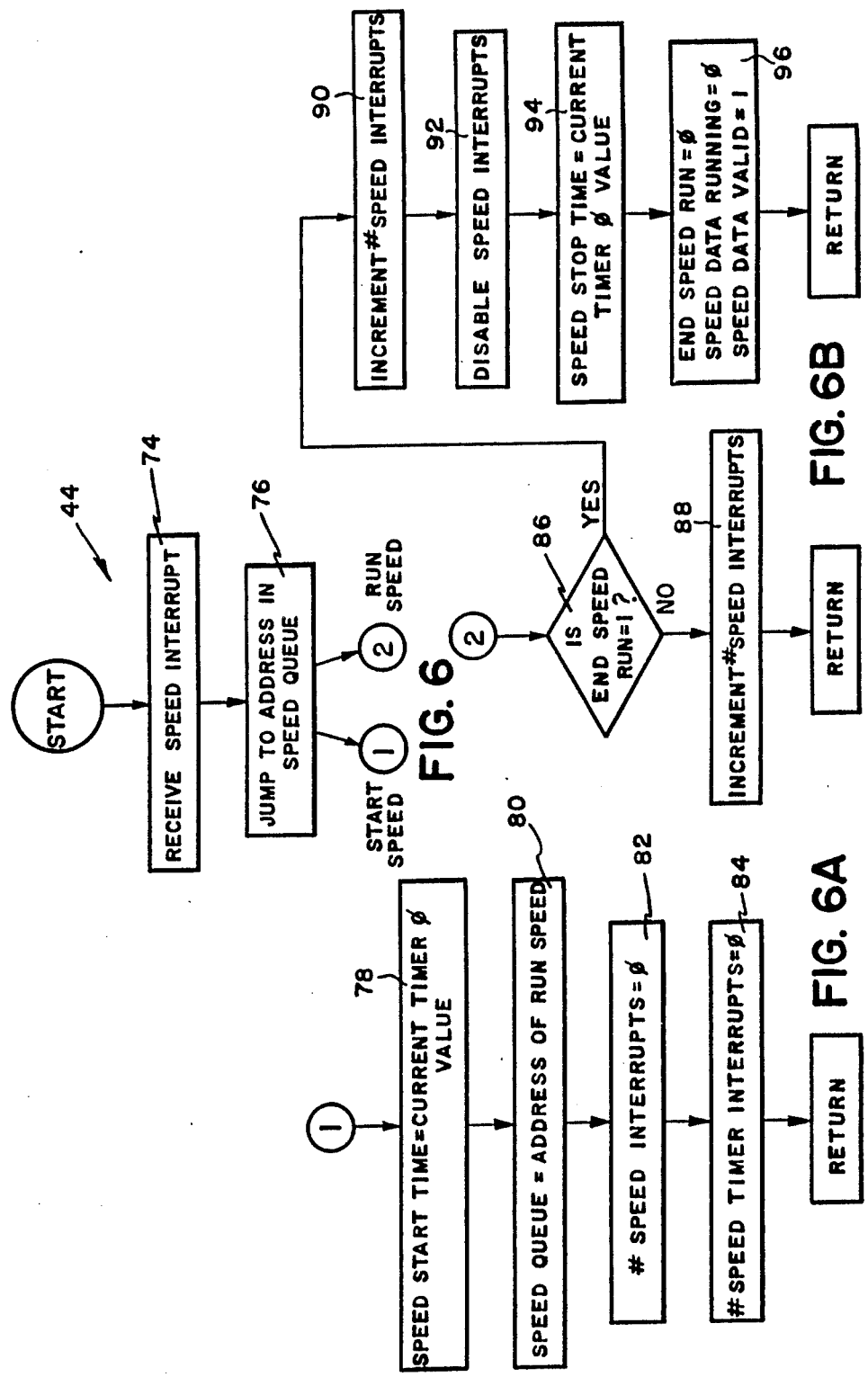
Figure 7:
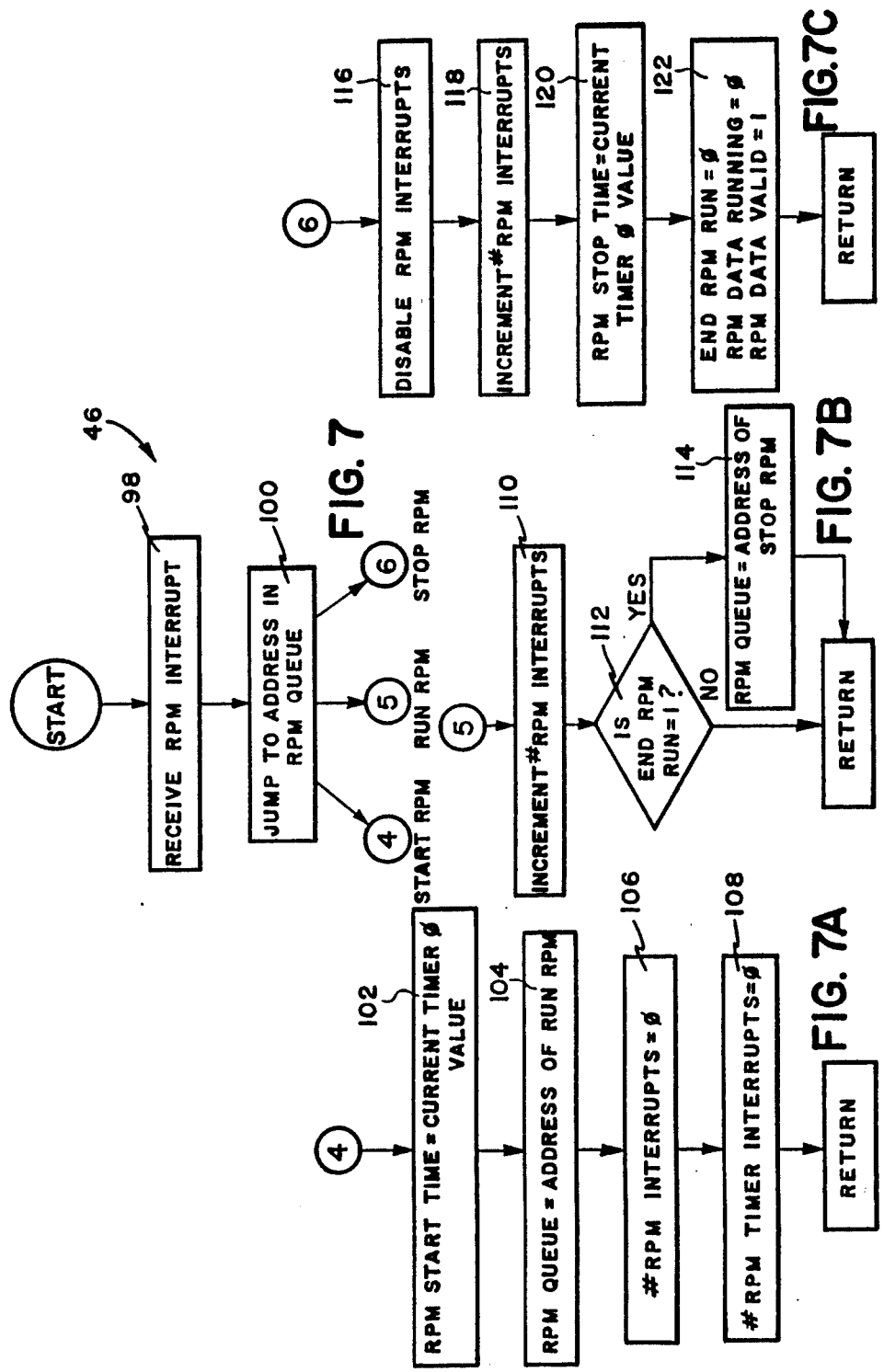
Figure 9:
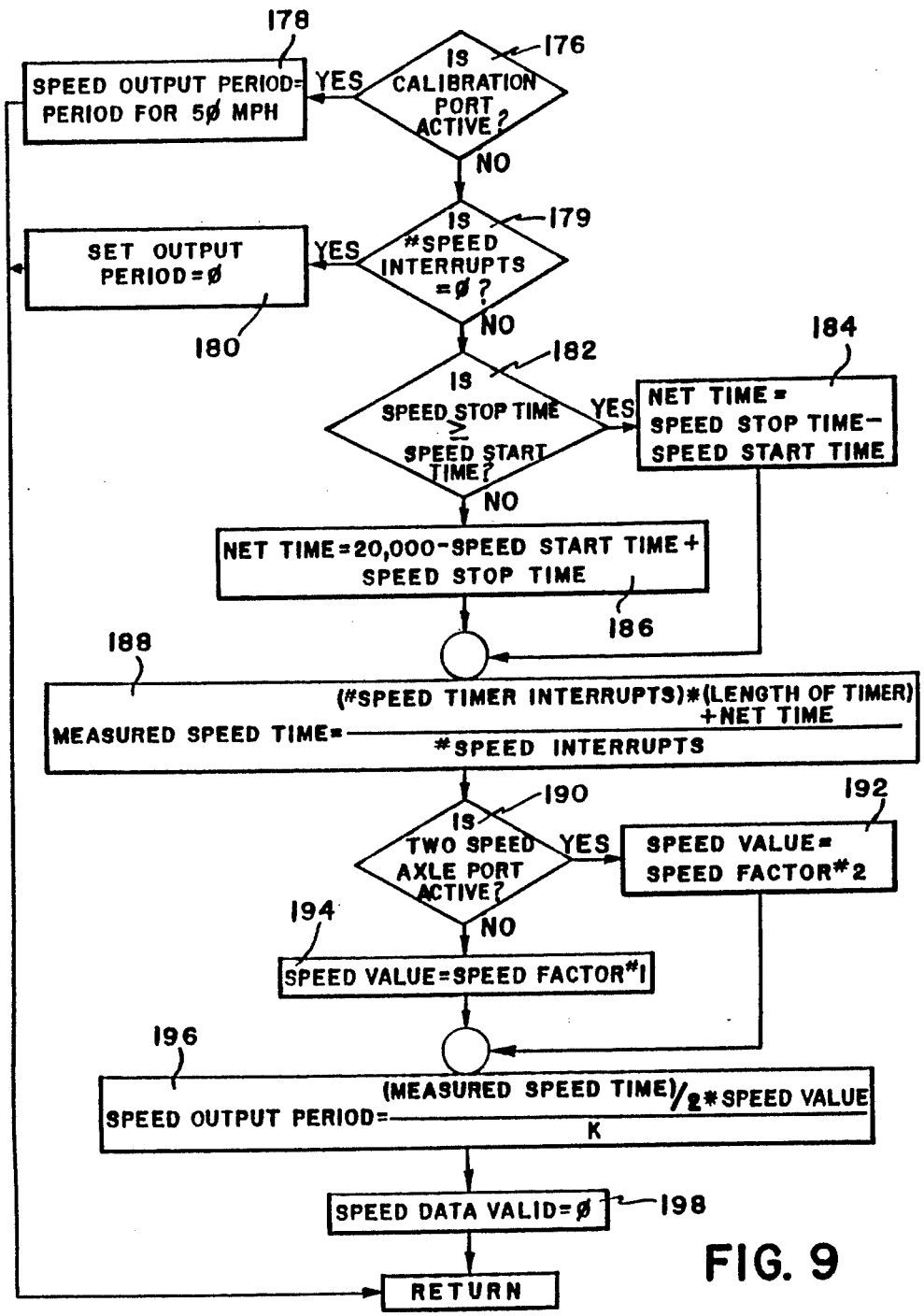
Figure 10:
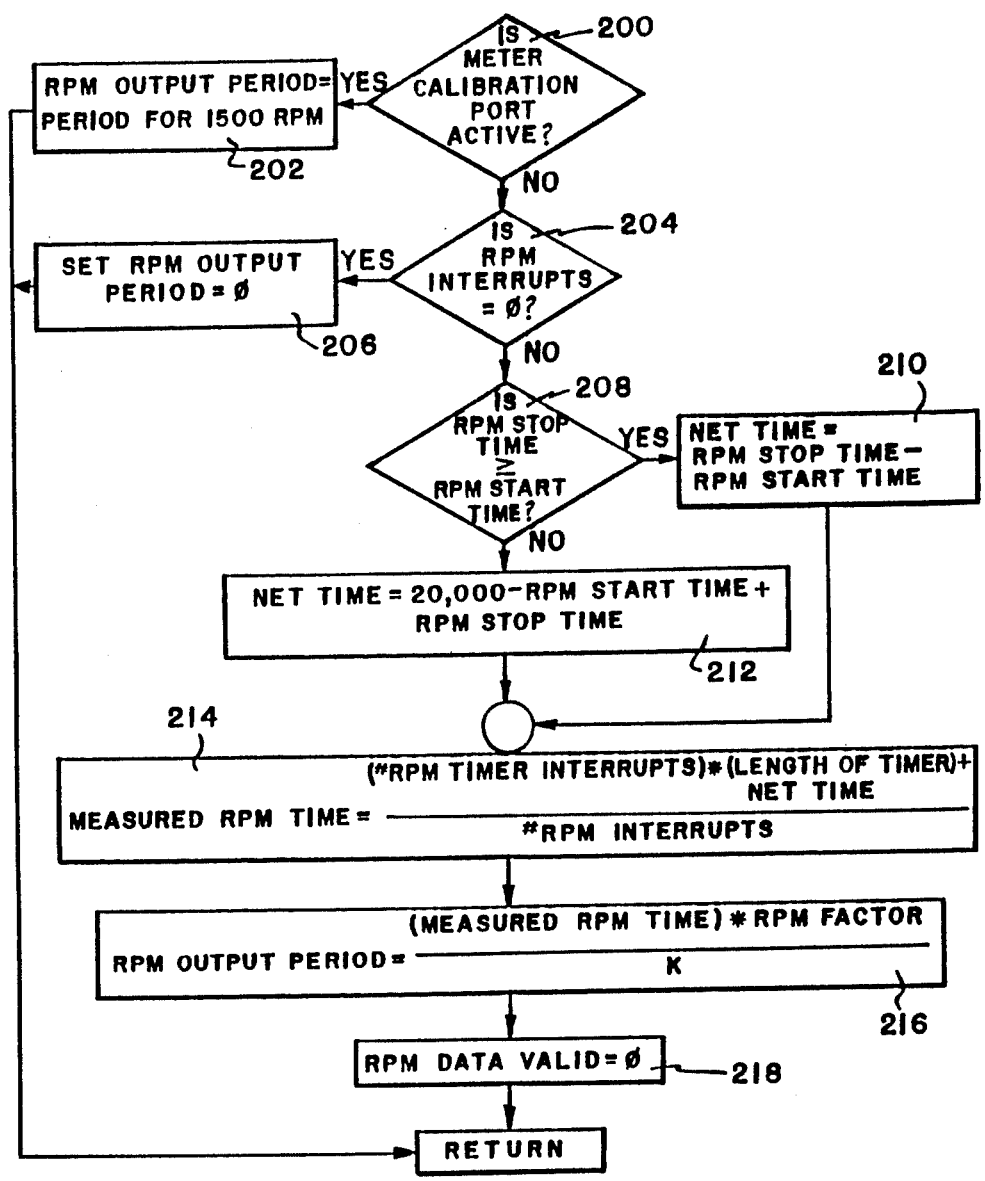
Figure 11:
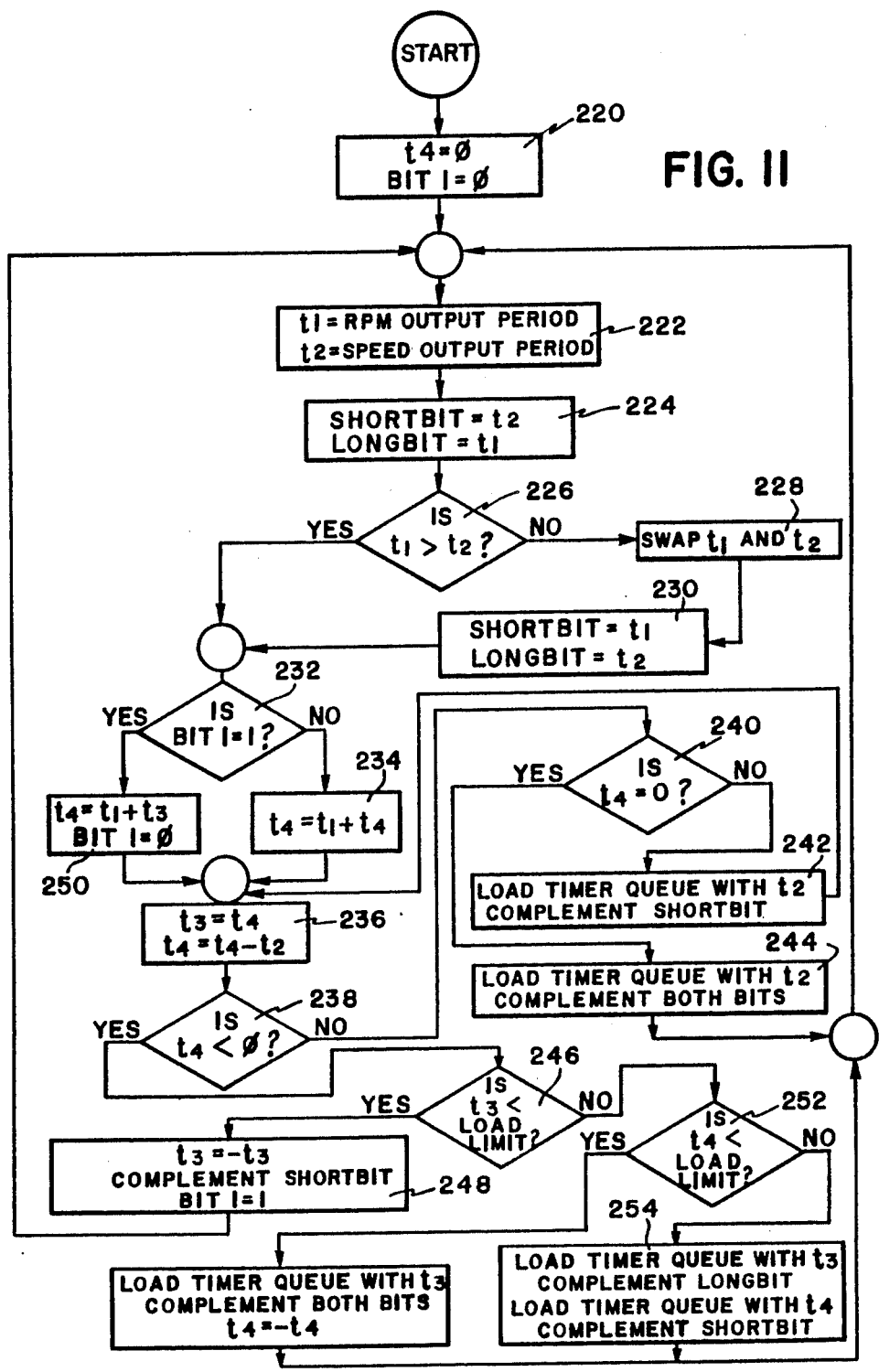

The manner in which the aforementioned signal processing is effected will be described in detail with reference to the system block diagrams of FIGS. 4–11. Referring to FIG. 4, the system proceeds through an initialization process as indicated at 38. The initialization process calls the subroutines that calculate the speed output period and the rpm output period as indicated at 40 and 42 respectively. However, before the speed and rpm output periods may be calculated, it is necessary to gather speed data as indicated at 44 and to gather rpm data as indicated at 46. The initialization subroutine is illustrated in FIG. 5; the speed output period subroutine 40 is illustrated in FIG. 9; the rpm output period referenced at 42 as illustrated in FIG. 10, and the speed data gathering subroutine 44 and rpm gathering subroutine 46 are illustrated in FIGS. 6 and 7 respectively. Before the speed and rpm output periods may be calculated, the interrupts must be controlled as indicated at 48 and 50. Although different subroutines are indicated for both the speed and rpm calculations, these subroutines are both illustrated in FIG. 8. Values calculated for the speed output period and rpm output period is indicated by 40 and 42 are then used to calculate the output timer periods and bits states as indicated at 52. The subroutine for doing so is illustrated in FIG. 11. The timer periods and bit states calculated in 52 are then transmitted to the output timer and bits queue 54, which is used to load the output timer 56. Since the queue 54 and timer 56 are both conventional, they are not illustrated in detail herein.

Referring now to FIG. 5, the initialization routine 38 is disclosed in detail. When the initialization routine 38 is started, all the random access memories are cleared as indicated at 58, the speed factor and rpm factors, which will be used as described hereinafter, are obtained from memory as indicated at 60, the timers are loaded as indicated at 62, and the timer interrupts are enabled as indicated at 64. As used herein, timer 0 is the timer used to calibrate the incoming signals, and timer 1 is the timer used to time the output periods of the output ports 30, 32. The initialization routine 38 then checks the speed data valid flag, as indicated at 66. The speed data valid flag is set at the end of the measurement cycle, so if the flag has been set, the program proceeds to call the calculate speed output period routine as indicated at 68. The calculated speed output period routine is indicated at 40 and is illustrated in detail in FIG. 9 hereof. The rpm data valid flag is then tested at 70. The rpm data valid flag is set during the calculation of the rpm output period in much the same way as the speed data valid flag is set during the speed output period calculation. If the rpm data valid flag is set, the rpm output period is calculated as indicated at 72 using the routine illustrated at 42 in FIG. 4 and as illustrated in FIG. 10.

Before calculation of the speed output periods and rpm output periods can begin, the wheel speed and rpm data must be initialized. The Gather Speed Data routine is illustrated at 44 in FIG. 4 and illustrated in detail in FIGS. 6, 6A, and 6B. The Gather Speed Data routine is started and receives the first speed interrupt as indicated at 74 from the vehicle speed sensors. As discussed hereinabove, the speed interrupt is defined as the second change in state of the output signals from the speed sensor. After the first speed interrupt is received, the routine jumps to the address in the speed queue as illustrated at 76. The speed queue is normally programmed to jump to the start speed routine illustrated in FIG. 6A unless the speed queue is instructed differently. Accordingly, when the first interrupt is received, the routine jumps to the routine illustrated in FIG. 6A. As indicated at 78, a speed start time is stored in memory and is set equal to the current value of the timer 0. The address in the speed queue is then changed as indicated at 80 to the address of the run speed routine in FIG. 6B. Accordingly, when the next interrupt is received, the routine will jump to FIG. 6B instead of 6A. As a part of the calculations to be described hereinafter, the number of speed interrupts are counted and stored in memory. In the routine illustrated in FIG. 6A, the number of speed interrupts is set equal to 0 as indicated at 82. As also to be described hereinafter, the calculations also require that the number of interrupts made by the timer 0 during the speed calculation also be counted. This is stored in memory as the number of speed timer interrupts, and is set equal to 0 as at 84.

On subsequent speed interrupts, the address set in the queue as at 76 will be the run speed routine illustrated at 6B, since the address in the queue was changed at 80 in FIG. 6A. At the start of the routine illustrated in FIG. 6B, the end speed run flag is tested to see if it has been set, as will be described in later calculations. This is indicated at 86 in FIG. 6B. The number of speed interrupts is then incremented as indicated at 88, and the results stored in memory. The routine then returns. If the end speed run has been set equal to 1, then the number of speed interrupts is incremented as indicated at 90. The speed interrupts from the speed sensors are then disabled as indicated at 92, and the speed stop time is stored in memory as the current value of the timer 0, as indicated at 94. As indicated at 96, the end speed run flag is set equal to 0, the speed data running flag is set equal to 0 and the speed data valid flag is set equal to 1.

The rpm data is gathered similarly as the speed data is gathered. The gathered rpm data routine is illustrated in the detailed FIG. 7, and is illustrated schematically at 46 in FIG. 4. An rpm interrupt is received as at 98, and, as indicated at 100, the routine is caused to jump to the address stored in the rpm queue. Unless readdressed, the address stored in the rpm queue is the start rpm routine illustrated in FIG. 7A. Referring to 7A, the rpm start time is stored in memory as the current value of the timer 0 as indicated at 102. As indicated at 104, the address in the rpm queue 100 is changed to the address of the run rpm routine illustrated in FIG. 7B. The number of rpm interrupts that are stored in memory is initialized to 0 as indicated at 106, and the rpm timer interrupts to be stored in memory are initialized as indicated at 108. As discussed hereinabove, the term "rpm interrupt" is the second change in state of the output of the rpm sensor, as illustrated graphically in FIG. 2.

Referring to the run rpm routine illustrated in FIG. 7B, a subsequent rpm interrupt causes the rpm queue to jump to the beginning of the routine illustrated in 7B, since the address in the rpm queue has been readdressed as indicated at 104 in FIG. 7A. The number of rpm interrupts is then incremented as indicated at 110, and the end rpm run flag is tested as indicated at 112. If the end rpm run flag has been set, the address in the rpm queue is changed to the address of the stop rpm routine illustrated at FIG. 7C, as indicated at 114. If the end rpm run flag has not been set, the program continues to calculate the rpm output period, as illustrated at 42 in FIG. 4 and in FIG. 10 hereof.

Referring now to FIG. 7C, after an rpm output period has been calculated by use of the subroutine illustrated in FIG. 10 and indicated at 42 in FIG. 4, the next rpm interrupt causes the program to jump, because of the readdress of the rpm queue as indicated at 114 in FIG. 7B, to the routine illustrated in FIG. 7C. This routine disables the rpm interrupts as indicated at 116, increments the number of rpm interrupts as indicated at 118, and sets the rpm stop time in memory as the current value of the timer 0 as indicated at 120. The routine then sets the end rpm run flag equal to 0, sets the rpm data running flag equal to 0, and sets the rpm data valid flag equal to 1, as indicated at 122. As indicated in FIG. 5, the speed data valid flag and the rpm data valid flags are used to determine whether to continue to calculate a speed output period or a rpm output period respectively.

As illustrated in FIG. 2, the output period for both speed and rpm are calculated over a predetermined number of timer interrupts. In FIG. 2, three timer interrupts are illustrated. The speed signal output period is calculated over three timer interrupts, but the rpm output period is calculated over only two timer interrupts. The timer interrupts are calculated and incremented, and the decision made as to whether to continue calculation of the output period or if the calculation has been completed, by use of the routine illustrated in FIG. 8. As illustrated in FIG. 4, the interrupts calculated in FIG. 8 are used to calculate the speed output period and the rpm output periods 40 and 42 respectively, as illustrated in detail in FIGS. 9 and 10, and, as has already been described, are also used in the gather rpm data routines and gather rpm speed data routines illustrated at 44, and 46.

Figure 8:
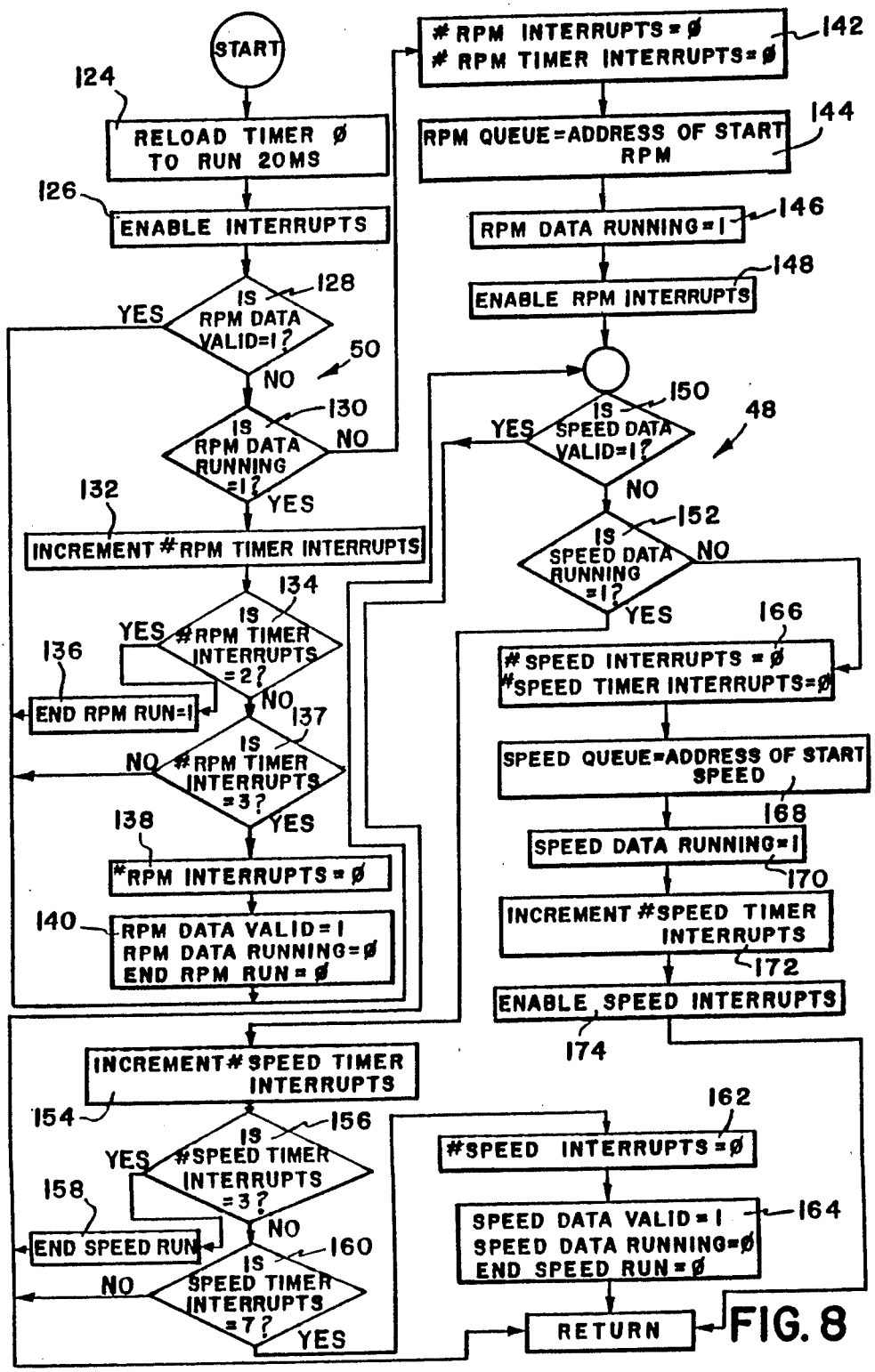

Referring to FIG. 8, when a timer 0 interrupt occurs timer 0 is reloaded as indicated at 124 and the interrupts are enabled as indicated at 126. As indicated at 128, the rpm data valid flag is checked. The routine branches to the speed data portion of the program if the rpm data valid flag has been set equal to 1. It will be recalled that the rpm data valid flag is set equal to 1 by the stop rpm routine illustrated in 7C, thereby indicating the end of a rpm measurement period. If the rpm data valid flag has not been set, the routine then checks the rpm data running flag as indicated at 130. This flag is set and reset as will be hereinafter described. If the rpm data running flag is equal to 1, the number of rpm timer interrupts stored in memory is incremented, as indicated at 132. As indicated at 134, the number of rpm timer interrupts stored in memory is then interrogated to see if it is equal to 2. If the number of rpm timer interrupts is equal to 2, the end rpm flag is set as indicated at 136. Accordingly, the time period over which the rpm output period is calculated is the time between two timer interrupts, plus the net time before and after the interrupts as will be hereinafter described.

If the number of rpm timer interrupts stored in memory is not equal to 2, the number is interrogated to determine if it is equal to 3, as indicated at 136. If the number of rpm interrupts is not equal to 3, indicating either that the measurement period has not yet been completed (if the number of timer interrupts is equal to 1 or 0), or that a new rpm output period can be calculated beginning at the next interrupt if the number of rpm timer interrupts is equal to 3. Accordingly, it is assured that at least 1 rpm timer interrupt occurs between calculation of successive measurement periods. If the number of rpm timer interrupts is equal to 3, the number of rpm interrupts is set equal to 0, as indicated at 138, and the rpm data valid, the rpm data running, and the end rpm run flags are reset, as indicated at 140.

If the rpm data running flag is not set equal to 1, indicating that at least one timer interrupt has occurred after the end of a measurement period, the number of rpm interrupts and the number of timer interrupts stored in memory are reset equal to 0, as indicated at 142. The address in the rpm queue is then reset equal to the address of the start rpm routine, as indicated at 144, the rpm data running flag is reset equal to 1 as indicated at 146, thereby enabling the start of a new measurement period, as indicated at 148.

The speed interrupts are calculated by the portion of the routine illustrated in FIG. 8 indicated generally by the numeral 48 (see FIG. 4). The calculation is made in an analogous way as to the rpm interrupt calculation described hereinabove. As indicated at 150, the speed data valid flag is tested, to determine if a new speed output period should be calculated. The speed data valid flag is set and reset as described hereinafter with respect to the calculation illustrated in FIG. 9, and with respect to the stop speed routine illustrated in FIG. 6. The speed data running flag is then tested as indicated 152, to determine if a new speed output period is now being calculated. If the flag is set equal to 1, the number of speed timer interrupts stored in memory is incremented as indicated at 154. The number of speed timer interrupts stored in memory is then tested, as indicated at 156, to determine if the number stored in memory is equal to 3. A speed measurement period is calculated, as illustrated in FIG. 2, but over 3 complete speed timer periods (plus any net time, as will be discussed hereinafter). If the number of speed timer interrupts is equal to 3, the end speed run flag is set as indicated at 158. If the speed timer interrupts is not equal to 3, the number in memory is tested to determine if it is equal to 7, as indicated at 160. If the number of speed timers is equal to 7, thereby assuring that several timer periods have occurred between calculation of a speed output period, the number of speed interrupts is set equal to 0 as indicated at 162, and the various flags are set as indicated at 164.

Referring back to decision block 152, if the speed data running flag has not been set equal to 1, thereby indicating that a new speed measurement period can be calculated, the number of speed timer interrupts is reset equal to 0, as indicated at 166, and the address stored in the speed queue is set equal to that of the start speed routine as indicated at 168. The speed data running flag is then reset equal to 1, as indicated at 170. The number of speed timer interrupts is incremented as indicated at 172, and the speed interrupts are enabled, as indicated at 174.

Referring now to FIG. 9, the speed gathered as indicated at 44 (FIG. 6) and the speed interrupts calculated at 48 (FIG. 8) are used to calculate the speed output period. Referring to FIG. 9, the calibration port 24 is tested to see if it is active or not, as indicated at 176. The meter calibration port can be controlled by a technician to display a predetermined output period, to thereby determine if one or more of the speed utilization devices 34 are functioning properly. If the meter calibration port is active, the speed output period is set equal to the period for 50 miles per hour, as indicated at 178. Accordingly, 50 miles per hour should be displayed on, for example, the vehicle electronic speedometer, to enable the technician to determine if this device is functional. If the meter calibration port is not active, the number of speed interrupts is tested to determine if it is equal to 0, as indicated at 179. If it is equal to 0 during the calculation of speed measurement period, the period is merely set equal to 0 as indicated at 180.

The net time, that is, referring to FIG. 2, the sum of the times between $t_b$ and $t_x$, and the time between $t_z$ and $t_c$, is then calculated. The speed stop time is checked to see if it is equal to or greater than the speed start time as indicated at 182. If it is, the net time is merely the difference between the stop time and the start time, as indicated at 184. If it is not, the net time is the difference between 20,000 (since the timer period is set equal to 20 milliseconds) minus the speed start time plus the speed stop time, as indicated at 186. The measured speed time can now be calculated as indicated at 188, as equal to the number of speed timer interrupts times the length of the timer (in this case 20 milliseconds) plus the net time, divided by the number of speed interrupts. In other words, referring to FIG. 2, the number of speed timer interrupts times the length of the timer gives the time between $t_x$ and $t_z$, while the net time adds on the time between $t_b$ and $t_x$ and between $t_z$ and $t_c$. The two speed axle port is then tested at 190. The two speed axle port 28 will be active if the two speed axle is set in one of two speeds and inactive if set in the other. Of course, the speed factors from which the speed output period is calculated will change depending upon which of the speed ranges the two speed axle has been placed in. If the two speed axle port is active, the speed value is set at speed factor #2 stored in memory, as indicated in 192 and if the two speed axle port is not active, the speed value is set equal to the first speed factor, as stored in memory, as indicated at 194. The speed output period is then calculated as indicated at 196 as equal to the measured speed time calculated at 188 times the speed value divided by a constant. The speed data valid flag is then reset equal to 0 as indicated at 198.

Referring now to FIG. 10, the rpm output period is calculated similar to the manner in which the speed output period is calculated using the routine illustrated in FIG. 9. The meter calibration port 24 is tested, as indicated at 200, and if active, the rpm output period is set equal to the period for 1500 rpm, as indicated at 202, thereby enabling testing of the rpm utilization device 36. If the calibration port is not active, the number of rpm interrupts is tested as indicated at 204 to determine if it is equal to 0. If the number of rpm interrupts is equal to 0, the rpm output period is also set equal to 0, as indicated at 206. If the number of rpm interrupts is not equal to 0, the rpm stop time is tested to see if it is equal to or greater than the rpm start time, as indicated at 208. If it is, the net time is calculated as equal to the rpm stop time minus the rpm start time, as indicated at 210. If the rpm stop time is not equal to or greater than the rpm start time, the net time is calculated, as indicated at 212, as equal to 20,000 minus the rpm start time plus the rpm stop time. The calculations made at 208, 210 and 212 are analogous to the calculations made at 182, 184 and 186 for the speed output period and will not be further described in detail herein. The measured rpm time is then calculated at 214 as equal to the number of rpm timer interrupts times the length of the timer (20 milliseconds) plus the net time (calculated at 210 or 212) divided by the number of rpm interrupts. The measured rpm time so calculated is, referring to FIG. 2, equal to the net time between $t_b$ and $t_c$, divided by the number of rpm interrupts. This measured rpm time, like the measured speed time calculated at 188 in FIG. 9, will vary in direct relation with the frequency of the pulses generated by the speed sensor 16 and the rpm sensor 18 respectively. The rpm output period is then calculated by multiplying the measured rpm time times the rpm factor divided by a constant, as indicated at 216. The rpm data valid flag is then reset as indicated at 218.

Accordingly, the speed output period and the rpm output period will vary in direct proportion to the frequency of the pulses generated by the speed sensor 16 and the rpm sensor 18 respectively. Therefore, the port 30 should be turned on and off at the beginning of a speed output period and the port 32 should be turned on and off at the beginning and end of an rpm output period. Accordingly, the speed utilization device and rpm utilization devices 34, 36, can "count up" during the period between changes of the states of the ports 30, 32 respectively. As discussed hereinabove, it is an important feature of the present invention that ports 30 and 32 are controlled by a single timer (referred herein as timer 1), thereby permitting control of both the devices 34 and the devices 36 by a single microprocessor 12, even though the output periods for the ports 30 and 32 are different. The manner in which the ports 30 and 32 are controlled is illustrated in FIG. 11.

Referring to FIG. 11, the routine is initialized as indicated at 220 by setting the variable $t_4$ equal to 0 and the flag $Bit_1$ equal to 0. Referring to 222, the variable $t_1$ is set equal to the rpm output period calculated as set forth in FIG. 10 and $t_2$ is set equal to the speed output period calculated in FIG. 9. As indicated at 224, the variable shortbit is set equal to $t_1$ and the variable longbit is set equal to $t_2$. As will be seen hereinafter, the "shortbit" is complemented, that is, its state is changed upon time out of timer 1. With the term shortbit and longbit set as indicated at 224, the port 30 bit state will be changed when the flow chart in FIG. 11 refers to the longbit being complemented, and the rpm output port 32 will have its state changed when the flow chart FIG. 11 indicates that the shortbit is being complemented. However, the periods $t_1$ and $t_2$ are checked as indicated at 226, to establish that $t_1$ is greater than $t_2$. If $t_1$ is not greater than $t_2$, $t_1$ and $t_2$ are swapped, as indicated at 228. Then, as indicated at 230, the shortbit is set equal to the $t_2$ output period and the long bit is set for the $t_1$ output period. Accordingly, when the flow chart in FIG. 11 indicates that the $t_1$ port is complemented after $t_1$ and $t_2$ have been swapped pursuant to 228, the rpm output port 32 will be complemented.

The flag $Bit_1$ is checked as indicated at 232, to see if it equals 1 or not. As discussed hereinabove, $Bit_1$ is set equal to 0 when the system is initialized at 220, so the first time through the flow chart of FIG. 11, $Bit_1$ will be equal to 0, and the calculation will proceed to block 234, where $t_4$ is set equal to $t_1$, plus $t_4$ which, the first time through the calculation, is equal to 0. The calculation then proceeds as indicated at 236, where the variable $t_3$ is set equal to $t_4$, and $t_4$ is calculated equal to $t_4$ minus $t_2$. The variable $t_4$ is then checked as indicated at 238 to see if it is less than 0. If it is not, it is checked to see if it is equal to 0 at 240, and if $t_4$ is not equal to 0, the timer queue 54 is loaded with the shorter period $t_2$ and the queue is instructed to complement shortbit upon timer time out, as indicated at 242. The routine then returns to 236, where another increment of the shorter period $t_2$ is subtracted from $t_4$. Referring to FIG. 3, the calculations performed at 236, 240 and 242 has the effect of subtracting the period $t_2$ from the period $t_1$ until the subtraction is less than 0. If the subtraction equals 0, as tested at 240, it indicates that the time $t_1$ is an even multiple of the time $t_2$. Accordingly, the timer queue, as indicated at 244, is loaded with the time $t_2$, and the timer queue instructs the timer 1 to complement both the bits 30 and 32 upon timer time out.

However, if the subtraction indicates a value less than 0, the value $t_3$ (which is the old value of $t_4$, as $t_3$ was set equal to $t_4$ at 236) is interrogated to determine if it is less than the timer load limit. A very small time cannot be loaded into the timer, because of the physical limitations of the timer. If $t_3$, as tested at 246, is less than the timer load limit, $t_3$ is set equal to $-t_3$, shortbit is complemented, thereby indicating the end of a timer period, and $Bit_1$ is set equal to 1, all as indicated at 248. The program then branches back to 222, so that, when subsequent output periods are calculated, the program will branch from 232 to 250, since $Bit_1$ will then be equal to 1 when tested at 232. When this occurs, $t_3$ is subtracted from $t_1$ and $Bit_1$ is reset to 0. Accordingly, the very small difference between the time $t_3$ and the load limit is subtracted off the output period of the longer output period when subsequent output periods are calculated. Although this induces a small inaccuracy on the timed period of period $t_1$, it prevents this small difference in load limit from "stacking up" on subsequent calculations, the accumulative effect thereby inducing large errors in the calculations.

If $t_3$ is greater than the timer load limit, the value of $t_4$, which is the difference between $t_3$ and the shorter period $t_2$, is interrogated as indicated at 252 to determine if it is less than the load limit. If it is less than the load limit, the timer queue is then loaded with $t_3$, as indicated at 253, which represents the difference in values between $t_1$ and the value in $t_2$ when the difference between $t_1$ and $t_2$ goes negative after subsequent values of $t_2$ are subtracted from $t_1$. Since the time $t_4$ is within the timer load limit, the timer queue is loaded with the time $t_3$ (see FIG. 3) so that both bits may be complemented at the same time upon timer time out. The fact that $t_4$ (again see FIG. 3) is less than timer load limit indicates that the period $t_1$ is almost an even multiple of $t_2$. $t_4$ is then set equal to $-t_4$, where it is used to adjust the period (see block 234) to permit these extremely small differences less than a timer load limit from accumulating into major errors in calculations.

The more common situation is when $t_4$, tested at 252, is greater than the timer load limit. Accordingly, as indicated at 254, the timer queue 54 is loaded with the time $t_3$, and instructed to complement shortbit upon time out, and the timer queue is then loaded with $t_4$, so that immediately upon time out of the time $t_3$, the timer will be loaded with $t_4$, and instructed to compliment longbit. Accordingly, and referring to FIG. 3, calculation block 254 loads the timer with the value indicated at $t_3$, which is the difference between the leading edge of the period $t_2$ and the trailing edge of the time period $t_1$. Accordingly, if the bit representing $t_1$ is complemented on timer time out when loaded with $t_3$, the other bit needs to be complemented upon time out of timer period $t_4$. Accordingly, by in essence using the shorter timer period $t_2$ as a "measure" of the period $t_1$, a single timer and queue can be used to control the output states of both the output ports 30 and 32.

We claim:

1. A method of using a single microcontroller having a programmable timer for generating output signals representing the calibrated vehicle speed and engine rpm of a road vehicle, said microcontroller having a pair of output ports connected to speed and rpm utilization devices respectively and a pair of input ports connected respectively to first signal generating means for generating signals in response to rotation of the vehicle wheels and second signal generating means for generating signals in response to rotation of the vehicle engine crankshaft, said method comprising the steps of:
   (a) reading the signals generated by said first and second signal generating means to provide output signals corresponding to vehicle speed and engine rpm, said output signals having generally different periods.
   (b) determining the output signal having the longer period and the output signal having the sorter period,
   (c) timing the output signal having the shorter period and toggling the output port corresponding to the output signal having the shorter period each time a timer timing the output signal having the shorter period times out,
   (d) timing the output signal having the longer period by using the output signal having the shorter period to time the output signal having the longer period, and (e) toggling the output port corresponding to the output signal having the longer period each time the longer output signal is in a predetermined relationship with the shorter output signal.

2. A method of using a microcontroller as claimed in claim 1, wherein the step of timing the output signal having the longer period is effected by:
(f) successively subtracting the output signal having the shorter period from the output signal having the longer period,
(g) using the timer to time the difference between the output signals to define a first quantity in which the difference between the output signals becomes less than the shorter period, and
(h) toggling the output port corresponding to the longer output signal when the timer times out said first quantity.

3. A method of using a microcontroller as claimed in claim 2, wherein said method further includes the steps of:
(f) using the timer to time a second quantity after the first quantity is timed out and
(g) toggling the output port corresponding to the shorter output signal when the second quantity is timed out, said second quantity being set equal to the difference between the shorter output signal and said first quantity.

4. A method of using a single microcontroller having a programmable timer to generate signals at a pair of output ports of said microcontroller marking the beginning and end of output periods of two separate time variant variables generally having different output periods, said method comprising the steps of:
(a) determining the longer and the shorter of said output periods,
(b) successively subtracting the shorter output period from the longer output period,
(c) memorizing the difference between the longer output period and the shorter output period as a first memorized difference when said difference is less than the value of the shorter output period,
(d) loading the timer with the shorter output period after each subtraction,
(e) starting the timer each time it is loaded,
(f) toggling an output port associated with the shorter output period each time that the timer times out after being loaded with the value of the shorter output period,
(g) loading the timer with said first memorized difference when the difference between said output periods is less than the value of the shorter output period,
(h) starting the timer, and
(i) toggling an output port associated with the longer output period after the time out after having been loaded with the first memorized value.

5. Method of using a microcontroller as claimed in claim 4, further including the steps of:
(j) loading the timer with a second memorized value representing the difference between the value of the shorter output period and said first memorized value after the timer times out said first memorized value,
(k) starting the timer, and
(l) toggling the output port associated with the shorter output period when the timer times out after having been loaded with said second memorized value.

6. A method of using a single microcontroller having a programmable timer for generating output signals representing the calibrated vehicle speed and engine rpm of a road vehicle, said microcontroller having a pair of output ports connected to speed and rpm utilization devices respectively and a pair of input ports connected respectively to first signal generating means for generating signals in response to rotation of the vehicle wheels and second signal generating means for generating signals in response to rotation of the vehicle engine crankshaft, said method comprising the steps of;
(a) reading the signals generated by said first and second signal generating means to provide output signals corresponding to vehicle speed and engine rpm, said output signals having generally different periods.
(b) determining the output signal having the longer period and the output signal having the shorter period,
(c) successively subtracting the shorter period from the longer period,
(d) memorizing the difference between the longer period and the shorter period as a first memorized difference when said difference becomes less than the value of the shorter period,
(e) loading the timer with the value of the shorter period after each subtraction,
(f) starting the timer each time it is loaded,
(g) toggling the output port associated with the shorter output period each time that the timer times out after being loaded with the value of the shorter output period,
(h) loading the timer with said first memorized difference when the difference between said periods becomes less than the value of the shorter period,
(i) starting the timer, and
(j) toggling an output port associated with the longer output period after the timer times out after having been loaded with the first memorized value.

7. Method of using a microcontroller as claimed in claim 6, further including the steps of:
(k) loading the timer with a second memorized value representing the difference between the value of the shorter output period and said first memorized value after the timer times out after said first memorized value, starting the timer, and
(l) toggling the output port associated with the shorter output period when the timer times out after having been loaded with said second memorized value.

8. Method of using a microcontroller as claimed in claim 7, further including the step of:
(m) toggling both of said output ports simultaneously if said first memorized value is less than a predetermined value representing the load limit of said timer, 9. Method of using a microcontroller as claimed in claim 8, further including the step of:
(n) adjusting the value of the longer output period by said first memorized on a subsequent measurement cycle when the memorized value is less than said predetermined value.

10. Method of using a microcontroller as claimed in claim 7, further including the steps of:
(m) determining if the second memorized value is less than a predetermined load limit,
(n) loading the timer with the first memorized value, starting the timer, and (o) toggling both output ports when the timer times out if the second memorized value is less than said predetermined load limit.

11. Method of using a microcontroller as claimed in claim 10, further including the step of:
(o) adjusting the value of the longer timer period on a subsequent measurement cycle if the value of the second memorized value is less than said predetermined load limit.

12. A method of using a microcontroller having a pair of timers to calibrate engine rpm and wheel speed signals of a motor vehicle and to generate signals at output ports of said microcontroller representing the calibrated engine rpm and wheel speed of said vehicle, comprising the steps of:
(a) providing pulsed input signals representing engine rpm and vehicle speed to said microcontroller,
(b) using one of said timers to generate both a speed output signal which varies in proportion to the frequency of the pulsed input representing vehicle speed and an rpm output signal which varies in proportion to the frequency of the pulsed input representing engine rpm,
(c) determining the output signal having the longer period and the output signal having the shorter period,
(d) using the other timer to time the output signal having the shorter period
(e) controlling a corresponding one of the output ports of said microcontroller,
(f) using the value of the shorter output signal to time the other output signal,
(g) controlling the other output port of the microcontroller,
(h) toggling the output port corresponding to the output signal having the shorter period each time a timer timing the output signal having the shorter period times out,
(i) timing the output signal having the longer period by using the output signal having the shorter period to time the output signal having the longer period, and
(j) toggling the output port corresponding to the output signal having the longer period each time the longer output signal is in a predetermined relationship with the shorter output signal.

13. A method of using a microcontroller having a pair of timers to calibrate engine rpm and wheel speed signals of a motor vehicle and to generate signals at output ports of said microcontroller representing the calibrated engine rpm and wheel speed of said vehicle, comprising the steps of:
(a) providing pulsed input signals representing engine rpm and vehicle speed to said microcontroller, 14. Method of using a microcontroller as claimed in claim 13, wherein said one timer is reloaded with a constant predetermined time period upon time out, the step of generating said output period signals including the steps of:
(k) counting pulses comprising the corresponding input signal over a period comprising at least a predetermined number of timer interrupts generated by time out of the first timer,
(l) adding the net time between the beginning and ending pulses and the beginning and end respectively of the corresponding timer periods to the number of timer periods multiplied by the length of a timer period, dividing by the number of pulses, and
(m) multiplying by a predetermined calibration factor.

15. A method of using a microcontroller having a pair of timers to calibrate engine rpm and wheel speed signals of a motor vehicle and to generate signals at output ports of said
(b) using one of said timers to generate both a speed output signal which varies in proportion to the frequency of the pulsed input representing vehicle speed and an rpm output signal which varies in proportion to the frequency of the pulsed input representing engine rpm,
(c) determining the output signal having the longer period and the output signal having the shorter period,
(d) using the other timer to time the output signal having the shorter period,
(e) controlling a corresponding one of the output ports of said microcontroller,
(f) using the value of the shorter output signal to time the other output signal,
(g) controlling the other output port of the microcontroller,
(h) successively subtracting the output signal having the shorter period from the output signal having the longer period,
(i) using the timer to time the difference between the output signals to define a first quantity in which the difference between the output signals becomes less than the shorter period, and
(j) toggling the output port corresponding to the longer output signal when the timer times out said first quantity. microcontroller representing the calibrated engine rpm and wheel speed of said vehicle, comprising the steps of:
(a) providing pulsed input signals representing engine rpm and vehicle speed to said microcontroller,
(b) using one of said timers to generate both a speed output signal which varies in proportion to the frequency of the pulsed input representing vehicle speed and an rpm output signal which varies in proportion to the frequency of the pulsed input representing engine rpm,
(c) determining the output signal having the longer period and the output signal having the shorter period,
(d) using the other timer to time the output signal having the shorter period,
(e) controlling a corresponding one of the output ports of said microcontroller,
(f) using the value of the shorter output signal to time the other output signal,
(g) controlling the other output port of the microcontroller,
(h) counting pulses comprising the corresponding input signal over a period comprising at least a predetermined number of timer interrupts generated by time out of the first timer,
(i) adding the net time between the beginning and ending pulses and the beginning and end respectively of the corresponding timer periods to the number of timer periods multiplied by the length of a timer period,
(j) dividing by the number of pulses, and
(k) multiplying by a predetermined calibration factor.

* * * * *